No. 742,428. PATENTED OCT. 27, 1903.
T. HILL.
CART OR OTHER VEHICLE.
APPLICATION FILED MAR. 20, 1903.
NO MODEL.

WITNESSES:
Gustave Dieterich
Edwin N. Dieterich

INVENTOR
Thomas Hill
BY
Chas. C. Gill
ATTORNEY

THE NORRIS PETERS CO., PHOTO-LITHO., WASHINGTON, D. C.

No. 742,428.

Patented October 27, 1903.

UNITED STATES PATENT OFFICE.

THOMAS HILL, OF JERSEY CITY, NEW JERSEY.

CART OR OTHER VEHICLE.

SPECIFICATION forming part of Letters Patent No. 742,428, dated October 27, 1903.

Application filed March 20, 1903. Serial No. 148,689. (No model.)

*To all whom it may concern:*

Be it known that I, THOMAS HILL, a citizen of the United States, and a resident of Jersey City, in the county of Hudson and State of New Jersey, have invented certain new and useful Improvements in Carts or other Vehicles, of which the following is a specification.

The invention relates to improvements in carts and other dumping-vehicles, and pertains more especially to the means hereinafter described for mounting the cart-body and springs, the present invention embodying certain improvements upon or for use in connection with the vehicle made the subject of Letters Patent of the United States No. 663,227, granted December 4, 1900, to Thomas Hill for improvements in carts and other vehicles.

The invention consists in the novel constructions, arrangements, and combinations of parts hereinafter described, and particularly pointed out in the claims; and the objects of the invention are to produce an improved means for mounting the body and springs of the vehicle with relation to the booms or shafts and to so arrange and dispose the parts of the structure as to prevent the weight of the load during the travel of the cart over rough surfaces from being thrown upon the horse drawing the vehicle.

The invention will be fully understood from the detailed description hereinafter presented, reference being had to the accompanying drawings, in which—

Figure 1:
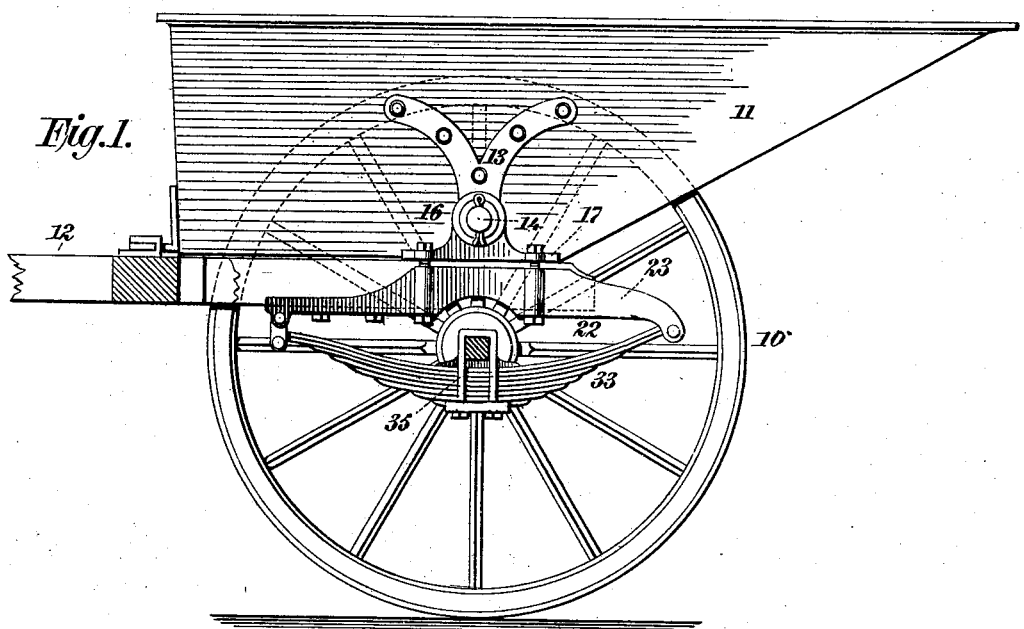
Figure 2:
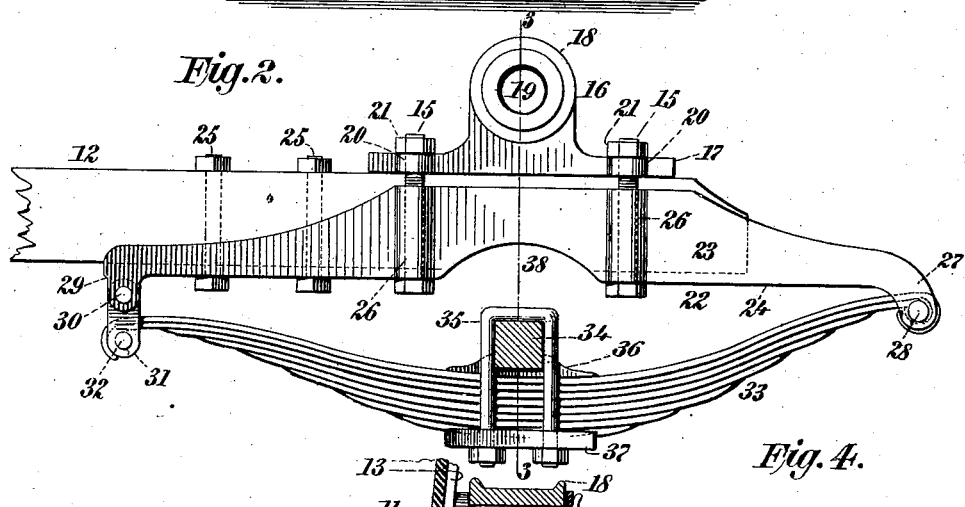
Figure 3:
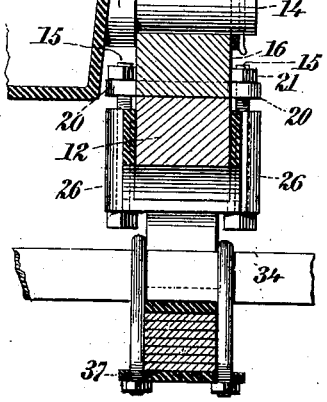
Figure 4:
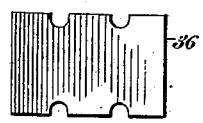

Figure 1 is a side elevation, partly in section and partly broken away, of a cart constructed in accordance with and embodying the invention. Fig. 2 is an enlarged side elevation, partly in section, of a portion of same. Fig. 3 is a vertical transverse section of same on the dotted line 3 3 of Fig. 2, and Fig. 4 is a detached top view of one of the plates used in connection with one of the springs.

In the drawings, 10 designates the usual cart-wheels, 11 the body of the cart or vehicle, and 12 the shafts or booms of the cart.

Upon opposite sides of the cart-body 11 are rigidly secured brackets 13, formed with or carrying the trunnions 14, upon which the cart-body is mounted, said trunnions 14 constituting the axis upon which said body may be dumped.

Upon the rear ends of the shafts or booms 12 are secured, by means of bolts 15, the axle-boxes 16 for the trunnions 14, these axle-boxes 16 being preferably formed of cast metal and having the flanged base 17 and elevated portion 18, containing the transverse aperture 19 to receive the trunnions 14. The base 17 corresponds in width with the top surface of the booms, upon which it directly rests, and has a firm bearing, and at its opposite sides the base 17 is formed with the apertured laterally-projecting ears 20, through which the vertical bolts 15 pass and over which the securing-nuts 21 are applied to said bolts. The boxes 16 are rigidly secured upon the booms 12, and they receive the trunnions 14, whereby the cart-body 11 becomes rigidly secured with relation to the booms or shafts 12 and can have no movement longitudinally thereof nor vertically independently thereof, but only a proper dumping movement upon the trunnions 14 and axle-boxes 16.

Upon the rear ends of the booms or shafts 12 are applied the cast-metal frames 22, which comprise the sides 23 and a bottom 24, the latter fitting upwardly against the lower surfaces of the booms or shafts 12 and said sides 23 fitting against the opposite sides of said shafts or booms, and the frames 22 are secured to the shafts or booms 12 by means of the aforesaid bolts 15 and the additional bolts 25, the latter passing upwardly through apertures in said shafts or booms, while the bolts 15 extend through laterally-projecting sleeves 26, cast upon the sides of the frames 22 in vertical line with the ears 20, cast upon the axle-boxes 16. The bolts 15 pass through the sleeves 26 and ears 20 and serve the twofold purpose of clamping the frames 22 and axle-box 16 against the lower and upper surfaces, respectively, of the shaft 12. The sleeves 26 afford additional strength to the frames 22 and enable the bolts 15 to resist any lateral force which might tend to drive the sides 23 laterally or outwardly from the sides of the shaft 12. In addition the presence of the sleeves 26 on the frames 22 and the ears 20 on the axle-box 16 enables the application of the bolts 15 without cutting into or weakening the shafts 12. The rear ends of the frames 22 are provided with the depending extensions 27, receiving the pin 28, and the front ends of said frames 22 are formed with the depending extensions 29 to receive the pin 30 for pivotally supporting the plates 31, which have in their lower end the pin 32.

The pins 28 32 receive the opposite ends of the semi-elliptic springs 33, which are by means of said pins suspended below the frames 22 and have secured upon their upper surfaces adjacent to or at their central portion the axle 34 for the cart-wheels 10, said axle 34 being strapped upon the spring 33 by means of the inverted-U-shaped bolts 35, disposed at opposite sides of the spring 33, as shown in Fig. 3, and passing through the plates 36 37, placed against the upper and lower surfaces of the springs 33, said bolts 35 at their lower threaded ends receiving nuts, by which they are detachably held in place. Above the cart-axle 34 the lower surfaces of the frames 22 and shafts or booms 12 are cut away, as at 38, so that during the travel of the cart over rough surfaces the said booms may have proper freedom of vertical movement.

The rear ends of the springs 33 are rigidly connected with the pins 28, so that said springs at their rear ends may not have any rearwardly-sliding action, it being my purpose that under the compression of the springs 33 their rear ends shall be firmly fixed and their front ends allowed to yield longitudinally, and it is for this reason that at the front ends of the frames 22 I provide the pivoted plates 31, carrying the pins 32 for receiving the front ends of the springs 33, the pivoted plates 31 allowing the front ends of said springs to move longitudinally of the shafts or beams 12. During the travel of the cart over rough surfaces the springs 33 will yield, and the forwardly-sliding action of the springs will under such circumstances prevent the throwing of the load upon the horse, to accomplish this result being one of the purposes of my invention.

The construction presented is entirely efficient and durable, which are features of great importance in dumping-vehicles, and in addition the cart body and shafts or booms are both spring-supported and the trunnions 14 have a rigid bearing over said shafts or booms and in substantially near relation thereto.

When the invention is applied to a dumping-cart, the booms 12 will extend forward to a sufficient extent to constitute the shafts for the horse; but in other classes of vehicles the booms 12 will constitute a part of the bed or frame, forming with the wheels and axles the running-gear.

What I claim as my invention, and desire to secure by Letters Patent, is—

1. In a vehicle, the body 11 having the trunnions 14, combined with the booms 12 having fixed thereon the axle-boxes 16 to receive said trunnions, the frames 22 applied to said booms, the springs 33 suspended below said frames and having secured to them the axle for the wheels of the vehicle; substantially as set forth.

2. The vehicle comprising the body 11 having the trunnions 14, combined with the booms 12, the axle-boxes 16 fixed upon said booms to receive said trunnions, and the springs 33 suspended below said booms to receive the main axle of the vehicle, said springs being fastened at their rear ends and free to yield longitudinally at their front ends; substantially as set forth.

3. The vehicle comprising the body 11 having the trunnions 14, combined with the booms 12 having fixed thereon the axle-boxes 16 to receive said trunnions, said axle-boxes comprising the elevated portion containing the aperture 19, and the flanged base 17 having the ears 20, combined with the frames 22 applied upon said booms and having the laterally-projecting sleeves 26, the bolts 15 extending through said ears and said sleeves for clamping said axle-boxes and said frames in position, and the springs 33 suspended by said frames 22 below said axle-boxes and receiving the main axle for the vehicle; substantially as set forth.

4. The vehicle comprising the body 11 having the trunnions 14, combined with the booms 12 having thereon the fixed axle-boxes 16 to receive said trunnions, the frames 22 applied upon said booms and having the end depending portions 27, 29, and the springs 33 suspended at their ends from said depending portions 27, 29, and receiving the main axle 34 of the vehicle; substantially as set forth.

5. The vehicle comprising the body 11 having the trunnions 14, and the booms 12 having thereon the fixed axle-boxes 16 to receive said trunnions, combined with the frames 22 applied upon said booms below said axle-boxes, the springs 33 suspended below said frames and from the ends thereof, the axle 34 secured upon the upper surface of said springs, the plates 36, 37 at the upper and lower surfaces of said springs, and the inverted-U-shaped bolts 35 at the opposite vertical sides of said springs and strapping said axles to said springs; substantially as set forth.

6. The vehicle comprising the body 11 having the side trunnions 14, and the booms 12 having thereon the fixed axle-boxes 16 to receive said trunnions, combined with the frames 22 applied to said booms and having the depending end portions 27, 29, the pivoted plates 21 secured to said depending portion 29, the springs 33 fastened at their rear ends to said depending portions 27 and at their front ends to said plates 31, and the main axle 34 for the vehicle secured to said springs 33; substantially as set forth.

7. In a vehicle, the body having the trunnions, combined with the booms, the axle-boxes for said trunnions, and the springs 33 suspended below said booms and having secured to them the axle for the wheels of the vehicle, said springs being fastened at their rear ends and free to yield longitudinally at their front ends; substantially as set forth.

Signed at New York, in the county of New York and State of New York, this 19th day of March, A. D. 1903.

THOMAS HILL.

Witnesses:
 CHAS. C. GILL,
 ARTHUR MARION.